United States Patent [19]
Hamilton

[11] 3,710,368
[45] Jan. 9, 1973

[54] BOOM ANGLE INDICATION SYSTEM
[75] Inventor: Martin W. Hamilton, Arlington Heights, Ill.
[73] Assignee: Eaton Corporation, Cleveland, Ohio
[22] Filed: Feb. 25, 1971
[21] Appl. No.: 118,658

[52] U.S. Cl................................340/267 C, 212/39
[51] Int. Cl..............................................G08b 21/00
[58] Field of Search.............340/267 C, 282; 212/39

[56] References Cited
UNITED STATES PATENTS 3,566,386  2/1971  Hamilton.........................340/267 C
3,285,430  11/1966  Whitmire............................212/39 R

*Primary Examiner*—Thomas B. Habecker
*Assistant Examiner*—Michael Slobasky
*Attorney*—Hill, Sherman, Meroni, Gross & Simpson

[57] ABSTRACT

A boom angle indication system includes a pendulum-type potentiometer for generating an electrical signal which is indicative of boom angle with respect to horizontal. The potentiometer is connected to a meter, calibrated in degrees, for reading by a crane operator. The system is further provided with means for establishing high and low boom angle limits and means for providing visual and/or audible alarms when the angle of inclination is outside of a permissible range.

16 Claims, 7 Drawing Figures

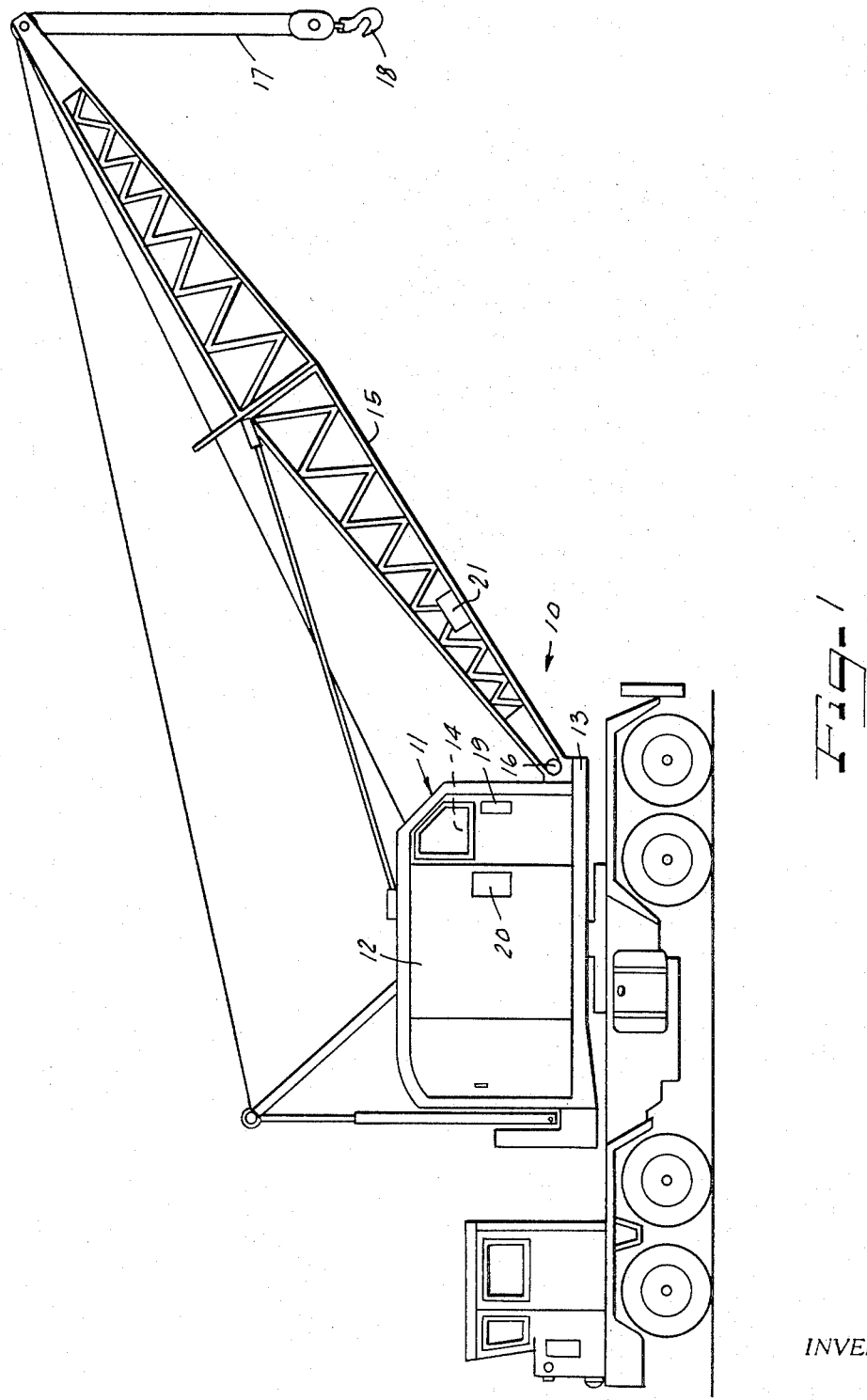

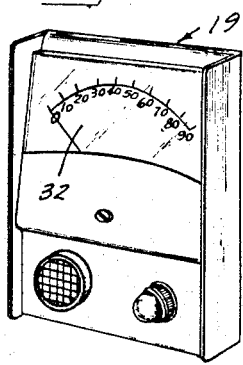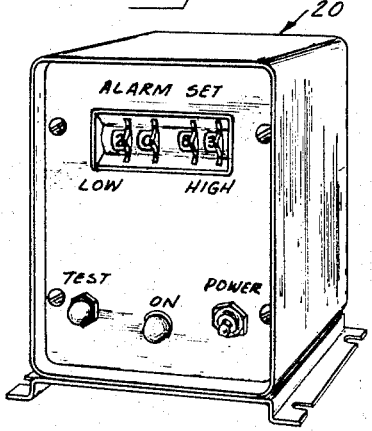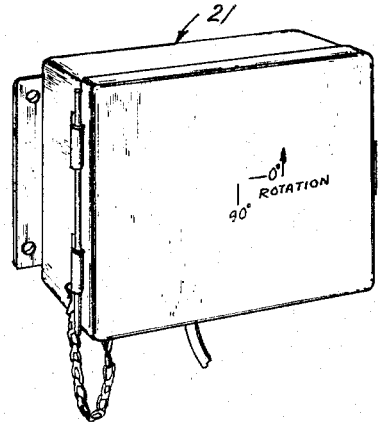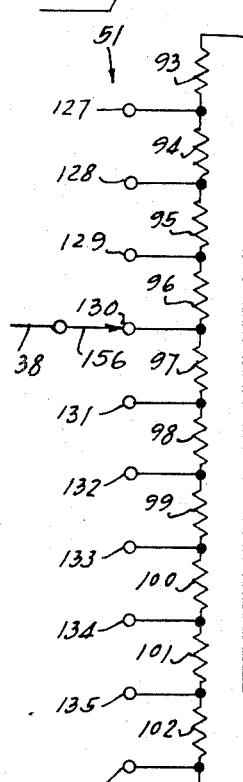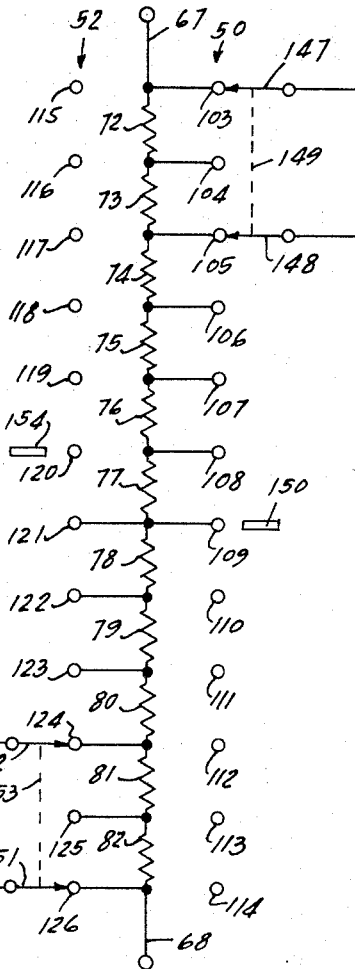

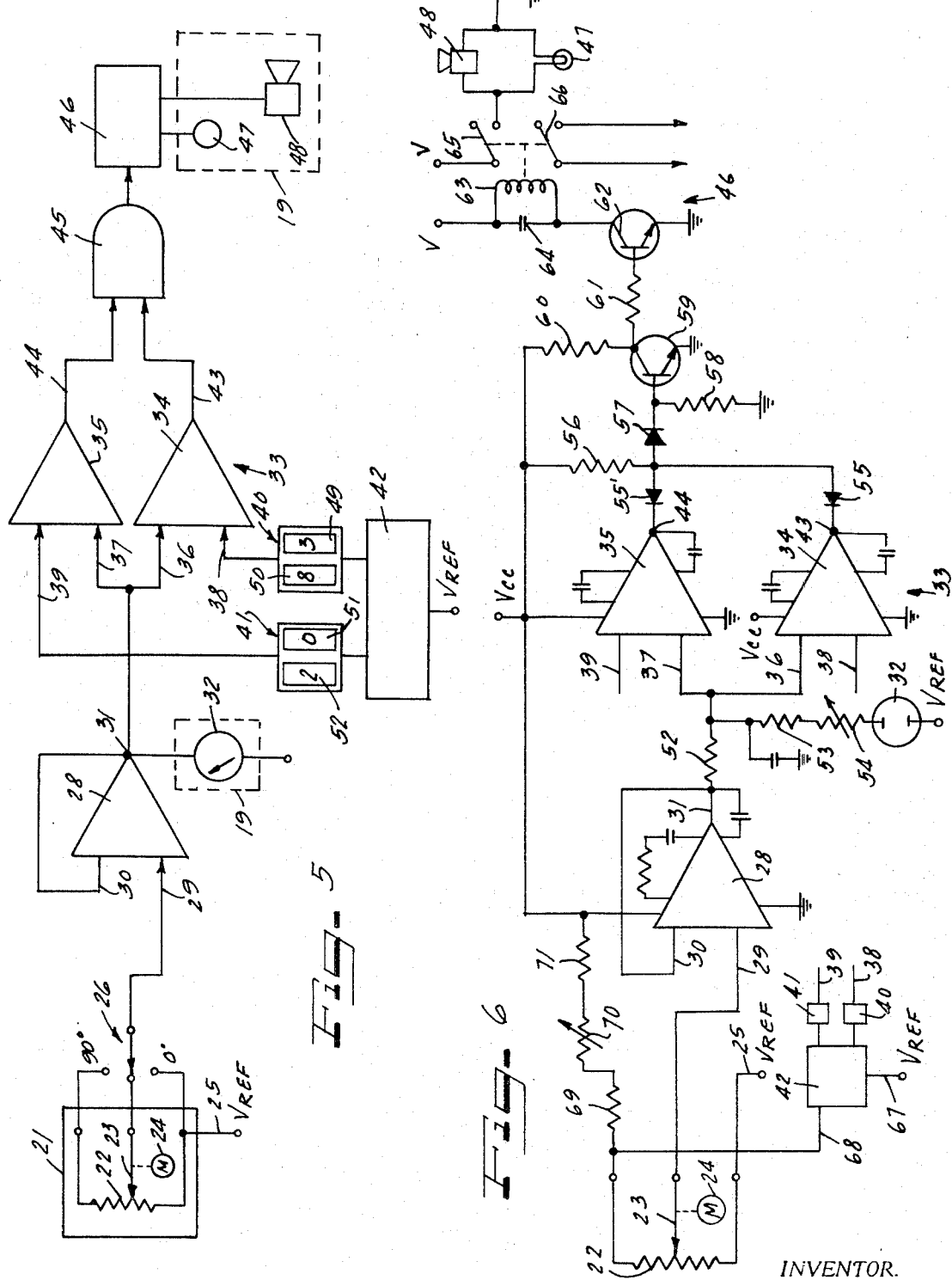

3,710,368

BOOM ANGLE INDICATION SYSTEM

BACKGROUND OF THE INVENTION

1. Field of the Invention

This invention relates to a boom angle indication system, and more particularly to a boom angle indication system which includes apparatus for setting a permissible range of boom angle inclination with respect to horizontal and apparatus for providing alarm signals when the boom is positioned to an angle that is outside of the permissible range.

2. Description of the Prior Art

Heretofore, a boom angle indicator was relatively simple in construction yet provided an accurate indication of the angle of inclination but with respect to the horizontal. In this respect, reference may be taken to U.S. Pat. of Martin W. Hamilton, No. 3,618,064, wherein a pendulum-type potentiometer is mounted on a boom for producing an electrical signal which is fed to a meter calibrated, as desired, in units of length or degrees. Such systems have generally left to the crane operator the task of determining the maximum and minimum angles of inclination, which required the operator to carefully monitor the meter.

SUMMARY OF THE INVENTION

It is therefore the primary object of the present invention to provide a boom angle indication system which will free the operator from having to constantly consult the angle of inclination meter and concentrate on his task of positioning a load which is suspended from the boom.

It is a further object of the invention to provide the crane operator with means for selectively setting high and low limits of the angle of inclination to thereby establish a range of permissible boom inclination; and to provide the operator, based on his selective settings, warning signals when he has positioned the boom outside of his desired or permissible range of inclinations.

A boom angle indication system comprises a pendulum-type potentiometer to be mounted on a boom and connected to a reference potential for producing an electrical signal which is indicative of the angle of inclination of the boom. The potentiometer is connected to a meter calibrated as desired, perhaps in degrees, by way of a unity gain amplifier. A resistor network and first and second switching means are employed to derive from a reference voltage other reference voltages indicative of high and low angular limits respectively. Each of these high and low limit references is connected to one input of respective differential amplifiers and the output of the unity gain amplifier is connected to the other input of each of these differential amplifiers, which differential amplifiers are individually responsive to a produced angle of inclination signal from the potentiometer which is of equal magnitude to its respective reference signal to operate a following gating circuit to energize a relay and driver circuit. The relay and driver circuit has connected thereto a visual alarm device and an audible alarm device. Therefore, a visual and/or audible alarm will be generated when the boom is positioned outside of the range of permissible boom angles selected by the crane operator. Corrective action may then be taken by the operator.

BRIEF DESCRIPTION OF THE DRAWINGS

Other objects, features and advantages of the invention will be best understood from the following detailed description of a preferred embodiment thereof taken in conjunction with the accompanying drawings, in which:

FIG. 1 is a pictorial diagram of a truck-mounted crane employing a boom angle indication system according to the present invention;

FIG. 2 is a pictorial representation of a meter read-out unit which forms a part of the boom angle indication system of the present invention;

FIG. 3 is a pictorial representation of a control unit which forms a part of the boom angle indication system of the present invention;

FIG. 4 is a pictorial representation of an angle transducer for mounting on the crane boom, which transducer forms a portion of the boom angle indication system of the present invention;

FIG. 5 is a schematic block diagram of an embodiment of the invention;

FIG. 6 is a schematic circuit diagram of the apparatus illustrated in block form in FIG. 5; and FIG. 7 is a schematic circuit diagram of a resistance network and switches for obtaining the high and low limit reference voltages for use in the circuit of FIGS. 5 and 6.

DESCRIPTION OF THE PREFERRED EMBODIMENT

A truck-mounted crane, illustrated in FIG. 1 and generally referenced 10, comprises a housing 11 including a portion 12 for sheltering the crane motor and cable drum apparatus, a base 13 which is rotatably mounted on the bed of the truck and a compartment 14 for the crane operator and his control apparatus. The crane further includes a boom 15 which is pivotally mounted at 16 to the base 13 and which carries a cable system 17 for raising and lowering a load which may be attached to a hook 18.

The crane further comprises a meter read-out unit 19 (FIG. 2) mounted for ease of visual access by the crane operator, a control unit 20 (FIG. 3) for setting upper and lower limits of boom angle of inclination, and an angle transducer 21 (FIG. 4) which is mounted on the boom to provide an electrical signal which is indicative of the angle of inclination of the boom. The meter read-out unit 19 is calibrated in degrees from 0 to 90 for accurate indication of the boom angle in relation to true horizontal. A warning light provides visual alarm indication when certain limits are exceeded. An audible signal is also provided by means of a high pitched sounding device which can easily be heard over the engine noise of a crane. The complete read-out unit may be housed in a heavy steel case and electrical connections may be made, for example, by a cannon-type connector at the rear of the unit. The control unit may also be housed in a steel, preferably weather-tight, case and have cannon-type connections provided at the rear thereof for electrical connection between the unit and the angle transducer, power supply and meter read-out units. As will be explained in greater detail below, the control unit 20 includes dual digital limit switches, a test button, a pilot lamp and power switch which are all located on the front panel. The digital switch provides a direct reading limit set in steps of 1°. Minimum differential between settings is 1°. The test button provides a convenient check of system performance by indicating, for example, 0° and 90° on the meter to turn on the alarm devices. The angle transducer unit 21 consists of a gravity regulated mechanism which converts an angular change in position of the boom into an electronic change in the circuit to the control unit 20. As will be explained in more detail below, this unit operates on a "pendulum" principle and is always accurate with respect to the horizontal plane. The angle transducer unit 21 is preferably completely sealed in a steel box and closed with a gasket and cover. Here too, the electrical connections to the control unit are made by a weatherproof connector and may include a heavy-duty synthetic rubber clad cable. The angle transducer unit is attached to the crane boom in such a way that the centerline of the unit is aligned with the longitudinal axis of the boom.

The apparatus further includes a suitable power supply, as will be evident below, which power supply is not disclosed herein in detail in that any suitable power supply may be employed.

A schematic block diagram of the boom angle indication system is illustrated in FIG. 5 as comprising the angle transducer unit 21 which includes a potentiometer 22 having a movable tap 23 which is influenced by a pendulum mass 24 to assume a corresponding position along the resistor 22. The resistor 22 is connected to a reference voltage V ref by way of a conductor 25. One end of the resistor 22 corresponds to the horizontal plane as indicated by the 0° contact of a test switch 26. The other end of the resistor 22 corresponds to a vertical position of the boom as indicated by the 90° contact of the test switch 26. The test switch 26 extends the electrical signal produced by the angle transducer unit 21 to an input 29 of an operational amplifier circuit 28 of a unity gain amplifier 27. The amplifier 28 has an output connection at the point 31 to a second input 30 of the amplifier. This amplifier may advantageously be of the type generally known as "709". Also connected to the output 31 is a meter 32 of the meter read-out unit 19. The meter 32 is serially connected between the output 31 and the reference voltage V ref and is calibrated to read in degrees. Therefore, the position of the boom which influences the pendulum mass 24 to position the movable tap 23 along the resistor 22 is reflected by a reading on the meter 32 and may be observed by the crane operator.

In order to free the operator from continuously monitoring the meter 32, means are provided for setting upper and lower angles of inclination of the boom and further means for providing an alarm to the operator when these limits have been exceeded. This apparatus comprises a differential amplifier section 33 which includes a differential amplifier 34 and a differential amplifier 35. The differential amplifier 34 and the differential amplifier 35 include respective inputs 36 and 37 which are connected to the output 31 of the operational amplifier circuit 28 and therefore each of these differential amplifiers receives the electrical signal which indicates the angle of inclination of the boom. Each of the differential amplifiers 34 and 35 also include respective other inputs 38 and 39 which are connected to controls for setting upper and lower limits of angular boom position. The differential amplifier input 38 is connected to the reference voltage V ref by way of a divider network 42 and a high limit switching unit 40. The high limit switching unit 40 includes a pair of thumb-wheel operated digital indicating switches 49 and 50 for setting the units and tens, respectively, of the desired upper angle limit. Similarly, the differential amplifier input 39 is connected to the reference voltage V ref by way of the divider network 42 and a low limit switching unit 41 which includes units and tens thumb-wheel controlled switches 51 and 52, respectively. The high and low switching units 40 and 41, together with the divider network 42, provide a pair of limit voltages to the inputs 38 and 39. When the electrical signal at the output 31 of the operational amplifier circuit 28 is the same as or exceeds the limit voltage signal to a differential amplifier (34, 35), that particular differential amplifier will be effective to provide an output signal at its respective output 43, 44.

The foregoing operation of either of the differential amplifiers 34, 35 is an indication that the boom has exceeded its upper or lower limit angle; therefore, means are provided for providing warning or alarm indications to the crane operator. These means include a gate circuit 45 having a pair of inputs connected to the outputs 43 and 44 of the differential amplifiers 34 and 35. The output of the gate circuit is connected to a relay and driver circuit 46 for energizing a visual alarm device 47 and/or an audio alarm device 48 which are mounted in the meter read-out unit 19.

A more detailed circuit diagram of the apparatus of FIG. 5 is illustrated in FIG. 6. Here, the test switch 26 has been omitted and the connections to a power supply have been indicated in somewhat greater detail. In FIG. 6 the potentiometer resistor 22 has a movable tap 23 which is influenced by the pendulum mass 24 to be positioned along the resistor 22. The resistor 22 is connected to a reference voltage V ref by way of a conductor 25 at one end thereof and connected to a voltage Vcc at the other end thereof by way of a network including resistors 69, 70 and 71. The voltages V ref and Vcc are preferably from a regulated supply and in this particular illustrated embodiment using "709" amplifier circuits would be 6.3 and 12.6 volts, respectively.

The movable tap 23 is connected to an input 29 of an operational amplifier 28 which has its output 31 connected to the other input 30 of the amplifier in a manner to provide unity gain. The output 31 of the amplifier 28 is connected to the reference voltage V ref by way of a series circuit including a resistor 52, a resistor 53, a variable resistor 54 and the meter 32. The variable resistor 54 may be utilized to calibrate the meter 32 which may be a 0-1 milliammeter which reads in degrees.

The output 31 is also connected to the respective inputs 36 and 37 of the differential amplifiers 34 and 35. These amplifiers are, as illustrated in the drawing, connected to the regulated source Vcc. The other inputs 38 and 39 of the amplifiers 34 and 35 are connected to the high and low limit switching units 40 and 41, which are in turn connected to the divider network 42 which receives two reference voltage connections, one to the reference voltage Vref by way of a conductor 67 and the other to a voltage derived by the resistors 69-71 by way of a conductor 68.

The output 43 of the differential amplifier 34 is connected to the cathode of a diode 55 and the output 44 of the differential amplifier 35 is connected to the cathode of a diode 55', the anodes of the diodes 55 and 55' being jointly connected through a resistor 56 to the supply voltage Vcc. The diodes 55 and 55' serve as inputs to a DTL gate 45 which further includes a diode 57 having its anode connected to the anodes of the diodes 55 and 55' and its cathode connected to ground by way of a resistor 58. The cathode of the diode 57 is further connected to the base of a transistor 59 which has its emitter connected to ground and its collector connected to the supply voltage Vcc by way of a resistor 60. Operation of either one of the differential amplifiers 34 and 35 will cause the base of the transistor 59 to go toward ground potential and render the transistor non-conductive.

The relay and driver circuit 46 includes a transistor 62 having its base connected to the collector of the transistor 59 by way of a resistor 61. The emitter of the transistor 62 is connected to ground and the collector of the transistor 62 is connected to a suitable source V by way of a relay winding 63 which is shunted by a capacitor 64. When the base of the transistor 59 goes toward ground to turn off, its collector goes toward the potential of the source Vcc to in turn enable the transistor 62 and energize the relay winding 63. The relay winding 63 has operably associated therewith relay contacts 65 and 66. The relay contact 65 completes an electrical circuit for energizing a lamp 47 as a visual alarm device and a high pitched audible alarm device 48. The contacts 66 are operated at the same time and may be employed to provide a similar indication at a remote point or may be utilized to provide other indications that the boom has been positioned beyond a set angular limit.

FIG. 7 schematically illustrates the electrical circuit of the high and low limit switching units 40 and 41 and the divider network 42. The divider network 42 includes a plurality of resistors 72-102 which are subdivided into serially connected groups including resistors 72-82, resistors 83-92, and resistors 93-102. The thumb-wheel switch 50 includes a plurality of contacts 103-114 which are connected or connectable to points along the series circuit which includes the resistors 72-82 and a pair of movable contacts 147 and 148 mechanically connected by a linkage 149 to move along the contacts 103-114. The thumb-wheel switch 50 selects the tens of the desired high limit from 90° down to 45° whereat the contacts engage a stop 150. This circuit could, however, be extended so that the upper limit could be set below 45° by removing the stop and connecting the contacts 110-114 to the appropriate points of the series circuit.

Similarly, the thumb-wheel switch 52 includes a plurality of contacts 115-126 which are connected to or connectable to points along the series circuit and a pair of movable contacts 151 and 152 which are mechanically connected by a linkage 153 and positionable to engage the contacts 115-126. The switch 52 is employed to select the tens of the lower angular limit from 0° up to 45° whereat a stop 154 is provided. This circuit could also be extended by connecting the contacts 115-120 to the appropriate points of the series circuit.

The thumb-wheel switch 49 is used to select angular units and includes a plurality of contacts 137-146 connected to points along the series circuit established by the resistors 83-92. The resistors 83-92 are connected in series across the resistors selected by the switch 50. This is then a fine adjustment of the selected tens voltage and is accomplished by the movable contact 155 which selectively engages one of the contacts 137-146 and which is connected to the conductor 39. In a like manner, the third group of resistors 93-102 is connected to contacts 127-136 of the thumb-wheel switch 51 to select the units portion of the lower limit. The switch 51 includes a movable contact 156 for selectively engaging the contacts 127-136 to extend the low limit reference voltage to the differential amplifier 33 by way of the conductor 38.

The foregoing has described a boom angle indication system in which means are provided for reading the angular position of a boom with respect to horizontal, means for selectively establishing a permissible range of boom angles by establishing high and low boom angle limits, and means for providing an alarm indication to a crane operator when he has positioned the boom beyond the defined upper and lower angular limits.

While I have described my invention with reference to a specific illustrative embodiment thereof, many changes and modifications of the invention will become apparent to those skilled in the art without departing from the spirit and scope of the invention, and it is to be understood that I intend to include within the patent warranted hereon all such changes and modifications as may reasonably and properly be included within the scope of my contribution to the art.

What I claim is:

1. Boom angle indicating apparatus comprising: a boom angle transducer for connection to a boom and operable to produce an angle signal indicative of the angle of the boom with respect to a reference plane; reference means operable to provide first and second reference signals indicative of respective angle limits of the boom to define a permissible range of boom position; first indicating means connected to said transducer for indicating boom angle; and second indicating means connected to said transducer and to said reference signal means and operable in response to an angle signal which is equal to said first or second reference signals to indicate that the boom is not within the permissible range, wherein said second indicating means comprises first and second differential amplifiers connected to receive respective ones of the first and second reference signals and to receive the angle signal, each of said differential amplifiers operable upon receipt of an angle signal of at least the magnitude of its respective reference signal; alarm means; and energizing means connected between said differential amplifiers and said alarm means operable to energize said alarm means in response to the operation of a differential amplifier.

2. The apparatus according to claim 1, wherein said boom angle transducer includes a pendulum-type potentiometer for connection to an electrical supply.

3. The apparatus according to claim 1, comprising an amplifier connected between said transducer and said first indicating means.

4. The apparatus according to claim 1, wherein said first indicating apparatus includes a meter having a dial calibrated in degrees.

5. The apparatus according to claim 4, comprising an amplifier connected between said transducer and said meter.

6. The apparatus according to claim 5, wherein said amplifier is an operational amplifier having unity gain.

7. The apparatus according to claim 1, wherein said reference means comprises an impedance network for connection to an electrical supply including first and second variable output means for providing said first and second reference signals.

8. The apparatus according to claim 1, wherein said energizing means includes gating means operable to perform an OR function.

9. The apparatus according to claim 1, wherein said energizing means includes relay means connected between said gating means and said alarm means and operable in response to the operation of said gating means.

10. The apparatus according to claim 8, wherein said alarm means includes a visual alarm device.

11. The apparatus according to claim 8, wherein said alarm means includes an audible alarm device.

12. The apparatus according to claim 9, wherein said relay means includes an electromechanical relay and an electronic relay driver.

13. Boom angle indicating apparatus comprising: a boom angle transducer for mounting on a boom, said transducer including a pendulum-type variable resistance for connection to an electrical supply and operable to produce an angle signal whose magnitude is indicative of the angle of the boom with respect to a reference plane; first indicating means including a meter calibrated in degrees; a unity gain amplifier connected to said transducer for coupling said transducer to said meter; a variable resistance network for connection to an electrical supply including first and second manually variable means operable to provide first and second reference signals to define a range of angle signal magnitudes representative of a permissible range of angular positions of the boom; switching means for receiving the angle signal and the first and second reference signals and operable to provide an electrical signal in response to an angle signal whose magnitude is outside the defined signal range; and alarm means connected to said switching means and operated in response to said electrical signal, wherein said switching means comprises a pair of differential amplifiers each of which is connected to said unity gain amplifier and to a respective manually variable means, and a gating circuit connected to each of said differential amplifiers and operable to provide said electrical signal.

14. The apparatus according to claim 13, wherein said switching means includes a relay connected to an energized by said gating circuit.

15. The apparatus according to claim 14, wherein said alarm means includes a visual alarm device connected to and operated by said relay.

16. The apparatus according to claim 15, wherein said alarm means includes an audible alarm device connected to and operated by said relay.

* * * * *